(12) United States Patent
Singh et al.

(10) Patent No.: US 10,169,477 B2
(45) Date of Patent: Jan. 1, 2019

(54) METHOD AND SYSTEM FOR RENDERING A WEB PAGE FREE OF INAPPROPRIATE URLS

(71) Applicant: SAMSUNG ELECTRONICS CO., LTD., Suwon-si (KR)

(72) Inventors: Dalvinder Singh, Noida (IN); Vinod Kumar Mishra, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 451 days.

(21) Appl. No.: 14/564,845

(22) Filed: Dec. 9, 2014

(65) Prior Publication Data

US 2015/0186542 A1    Jul. 2, 2015

(30) Foreign Application Priority Data

Dec. 30, 2013   (IN) .......................... 6148/CHE/2013

(51) Int. Cl.
  *G06F 17/22*   (2006.01)
  *G06F 17/30*   (2006.01)
(52) U.S. Cl.
  CPC .............. *G06F 17/30887* (2013.01)
(58) Field of Classification Search
  CPC .... G06F 17/30; G06F 17/22; G06F 17/30887; H04L 29/06
  See application file for complete search history.

(56) References Cited

U.S. PATENT DOCUMENTS

| 5,375,244 | A | * | 12/1994 | McNair | G06F 21/316 340/5.74 |
| 5,696,898 | A | * | 12/1997 | Baker | G06F 21/604 707/999.009 |
| 5,706,507 | A | * | 1/1998 | Schloss | H04L 12/14 707/754 |
| 5,761,683 | A | * | 6/1998 | Logan | G06F 17/30905 707/E17.121 |
| 5,802,299 | A | * | 9/1998 | Logan | G06F 17/30905 707/E17.121 |
| 6,065,055 | A | * | 5/2000 | Hughes | G06F 17/30867 707/E17.109 |
| 6,297,819 | B1 | * | 10/2001 | Furst | G06F 3/00 707/E17.001 |
| 6,389,472 | B1 | * | 5/2002 | Hughes | G06F 17/30867 707/E17.109 |
| 6,584,498 | B2 | | 6/2003 | Nguyen | |
| 6,742,047 | B1 | * | 5/2004 | Tso | G06F 17/30867 707/E17.109 |

(Continued)

FOREIGN PATENT DOCUMENTS

EP   1800228       4/2006
EP   2194471 A1    6/2010

(Continued)

*Primary Examiner* — Maikhanh Nguyen
(74) *Attorney, Agent, or Firm* — Sughrue Mion, PLLC

(57) ABSTRACT

A method and a system for rendering a web page free of inappropriate URLs include parsing a web page to identify a plurality of Universal Resource Locators (URLs) within the web page. Further, the method includes preloading the plurality of URLs identified and detecting the URLs having inappropriate content. Furthermore, the method includes rendering a web page free of the inappropriate URLs.

3 Claims, 8 Drawing Sheets

(56) References Cited

U.S. PATENT DOCUMENTS

| | | | | |
|---|---|---|---|---|
| 6,925,485 B1* | 8/2005 | Wang | ............... | G06F 17/30902 |
| | | | | 707/E17.12 |
| 6,976,070 B1* | 12/2005 | Hoashi | ............. | G06F 17/30867 |
| | | | | 707/999.104 |
| 7,308,504 B2* | 12/2007 | Satuloori | ............... | H04L 29/06 |
| | | | | 709/224 |
| 7,533,144 B2 | 5/2009 | Kassab | | |
| 7,536,445 B2* | 5/2009 | Kinoshita | ......... | G06F 17/30864 |
| | | | | 709/217 |
| 7,689,666 B2* | 3/2010 | Commons | ......... | G06F 17/30887 |
| | | | | 709/217 |
| 8,098,939 B2* | 1/2012 | Oliver | ............... | G06K 9/00463 |
| | | | | 382/203 |
| 8,161,370 B2 | 4/2012 | Nguyen | | |
| 8,443,304 B2* | 5/2013 | Cragun | ............. | G06F 17/30905 |
| | | | | 715/742 |
| 8,474,048 B2* | 6/2013 | Masood | ................. | G06F 21/51 |
| | | | | 709/203 |
| 8,539,038 B2* | 9/2013 | Jones | ...................... | H04L 29/06 |
| | | | | 709/203 |
| 2002/0065912 A1* | 5/2002 | Catchpole | ......... | G06F 17/30873 |
| | | | | 709/224 |
| 2004/0006621 A1* | 1/2004 | Bellinson | .......... | G06F 17/30867 |
| | | | | 709/229 |
| 2004/0107177 A1* | 6/2004 | Covill | ............... | G06F 17/30893 |
| 2004/0210532 A1* | 10/2004 | Nagawa | ............ | G06F 21/6218 |
| | | | | 705/51 |
| 2004/0267929 A1* | 12/2004 | Xie | ........................ | H04L 29/06 |
| | | | | 709/225 |
| 2005/0144297 A1* | 6/2005 | Dahlstrom | ............ | H04L 63/101 |
| | | | | 709/229 |
| 2008/0005319 A1* | 1/2008 | Anderholm | ............ | G06Q 10/00 |
| | | | | 709/224 |
| 2008/0131005 A1* | 6/2008 | Oliver | ................ | G06K 9/00463 |
| | | | | 382/229 |
| 2008/0209057 A1* | 8/2008 | Martini | ............. | G06F 17/30867 |
| | | | | 709/229 |
| 2009/0172560 A1* | 7/2009 | Cole | ................ | G06F 17/30905 |
| | | | | 715/744 |
| 2010/0005084 A1 | 1/2010 | Nguyen et al. | | |
| 2010/0115615 A1* | 5/2010 | Hubbard | ........... | G06F 17/30864 |
| | | | | 726/22 |
| 2011/0145362 A1* | 6/2011 | Jones | ...................... | H04L 29/06 |
| | | | | 709/217 |
| 2012/0042289 A1* | 2/2012 | Cragun | ............. | G06F 17/30905 |
| | | | | 715/865 |
| 2012/0167231 A1* | 6/2012 | Garcia | ................ | G06F 21/6218 |
| | | | | 726/27 |
| 2015/0128218 A1* | 5/2015 | Vogel | ..................... | G06Q 10/00 |
| | | | | 726/4 |

FOREIGN PATENT DOCUMENTS

| | | |
|---|---|---|
| KR | 2000-0072172 A | 12/2000 |
| KR | 10-1225292 B1 | 1/2013 |
| WO | 2013/091346 A1 | 6/2013 |

* cited by examiner

METHOD AND SYSTEM FOR RENDERING A WEB PAGE FREE OF INAPPROPRIATE URLS

CROSS-REFERENCE TO RELATED APPLICATION

This application claims priority from India Patent Application No. 6148/CHE/2013, filed on Dec. 30, 2013 in the India Patent Office, the disclosure of which is incorporated herein by reference in its entirety.

BACKGROUND

1. Field

The present invention relates to the field of web page management, and more specifically to the field of rendering a web page free of inappropriate URLs.

2. Description of the Prior Art

The Internet is a wide area network where users can access or contribute content via web pages. The contents in the web page include, for example but not limited to, text, documents, audio, video and image content, software, website articles, blogs, marketing and shopping portals, social networking sites and media sharing sites. Each web page is identified by a Uniform Resource Locator (URL) also known as web address. A user may access a web site by either typing the URL of the web site into a browser screen or by using a search engine. The retrieved web page may include links such as URLs and hyperlinks that redirects to other related pages, websites, files, downloadable software, source documents and other web resources. Thus, the user can jump from a first web site to a second web site by selecting a link on a web page present in the first web site. Often, the links present in a web page are preloaded in a cache to enhance user experience and reduce latency in loading successive web pages.

However, many web sites contain content that people may find offensive and inappropriate, including text and images that may be obscene, pornographic, racist, graphically violent, or the like. The user may inadvertently or deliberately access offensive material by selecting a URL link within an inoffensive web site. Therefore, the user is prone to unwanted or inappropriate content while browsing the web pages in a browser. The problem is acute when the user is a child.

An existing prior art provides a method for inserting contents into a requested web page and providing a modified web page in a browser. Further, there exist browser systems providing parent control in selecting the web sites and individual web pages that the child may access.

In another prior art, a browser system denies access to a second web page if an offensive link present within a first web page is selected by a user. However, the user can copy the offensive link from the first web page and retrieve the offensive link from another browser system. Thereby, the existing systems pose a threat to content control, since the offensive links are visible to the user. Moreover, the prior art fails to provide the web pages free of inappropriate contents by hiding the offensive links in the requested web pages. Often, it is desired to render a modified web page to a user after disabling the offensive URL's from the requested web page, especially when the web page is accessed by a child.

In light of the foregoing discussion, there is a need for an improved method and system to preload entire URLs or links present in a requested web page and check authenticity of content pointed to by the URLs and further display a modified web page to the user after disabling inappropriate URLs.

SUMMARY

Embodiments of the present disclosure described herein provide a method and system for displaying a modified web page to a user after disabling inappropriate URLs in response to a request for a web page. The method includes preloading of URLs present within a web page to fetch at least one of metadata information and webpage content corresponding to the URLs. Further, the method includes analysing the fetched data to detect offensive contents in the URLs and disabling corresponding URLs in the requested webpage.

An example of a method for rendering a web page free of inappropriate content includes parsing a requested web page to identify a plurality of Universal Resource Locators (URLs) within the web page. Further, the method includes preloading the plurality of URLs identified and categorizing content pointed to by the URLs as at least one of an appropriate content and an inappropriate content. Furthermore, the method includes rendering a modified web page free of inappropriate URL.

An example of a method for detecting inappropriate Universal Resource Locators (URLs) in a web page includes requesting the web page via a web browser by a user and parsing the web page to extract a plurality of URLs present in the web page. Further, the method includes preloading the plurality of URLs present in the web page, wherein preloading enables fetching metadata information of the plurality of URLs. The method includes detecting an inappropriate URL based on the metadata information of the plurality of URLs.

An example of a system for detecting inappropriate URLs in a web page includes a network module to fetch a web page requested by a user, wherein the network module fetches the web page from a web server. Further, the system includes a loader module to load the web page requested by the user. The system includes a tokenizing module to parse the web page. Further, the system includes a content control module to preload the plurality of URLs to fetch data from each of the plurality of URLs. The data includes metadata information and webpage content. Further, the content control module detects at least one of an inappropriate URL based on the metadata information and web page content of the corresponding URL.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Embodiments of the present disclosure described herein provide a method and a system for displaying a modified web page to a user after disabling inappropriate URLs in response to a request for a web page. The retrieved web page may include links such as URLs and hyperlinks that redirects to other related pages, websites, files, downloadable software, source documents and other web resources. Thus, the user can jump from a first website to a second website by selecting a link on a web page present in the first web site. Often, the links present in the web page are directed to offensive and unwanted content. The present invention provides a method for detecting URLs having offensive and unwanted content. Further, the method includes disabling URLs that are detected, thereby presenting a modified web page to the user.

Figure 1:
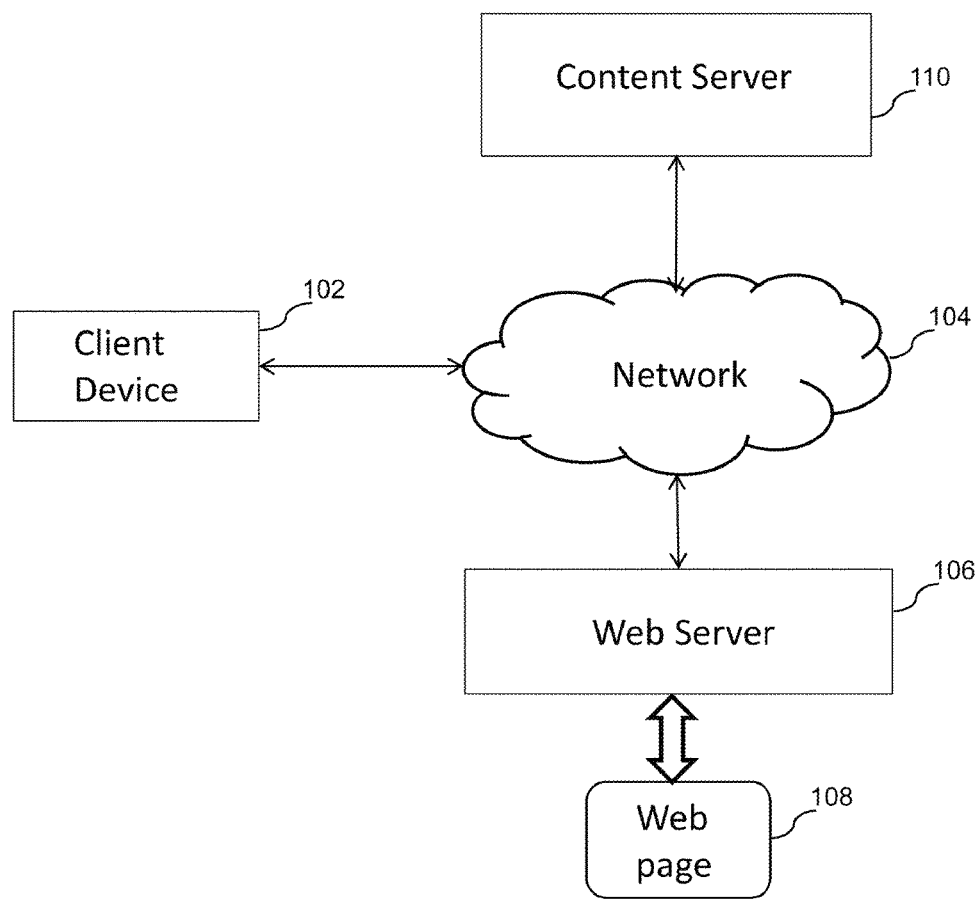
FIG. 1 is a block diagram of an environment, in accordance with which various embodiments of the present invention can be implemented.

FIG. 1 is a block diagram of an environment, in accordance with which various embodiments of the present invention can be implemented. The environment includes a client device 102 connected to a network 104. The network 104 can be at least one of a Local Area Network (LAN) and a wide area data communications network. The client device 102 further communicates with the content server 110 via the Network 104.

Content server 110 is a stand-alone component in which large quantity of electronic documents of any format and with any content can be stored. A browser application in accordance with the principles of the present invention is installed on a client device 102 to display a web page. Further, the client device 102 is connected to a Web server 106 via the Network 104. When connected on a network, a web browser can retrieve web pages from a web server 106. The web page is a web document that is suitable for a web browser. A user can access variety of content in the web page through the Internet. Examples of the client device 102 include, but are not limited to personal computer, laptop, Smart television, Personal Digital Assistant (PDA), smart phone, and tablets. In one embodiment, the client device is a Smart TV.

Figure 2:
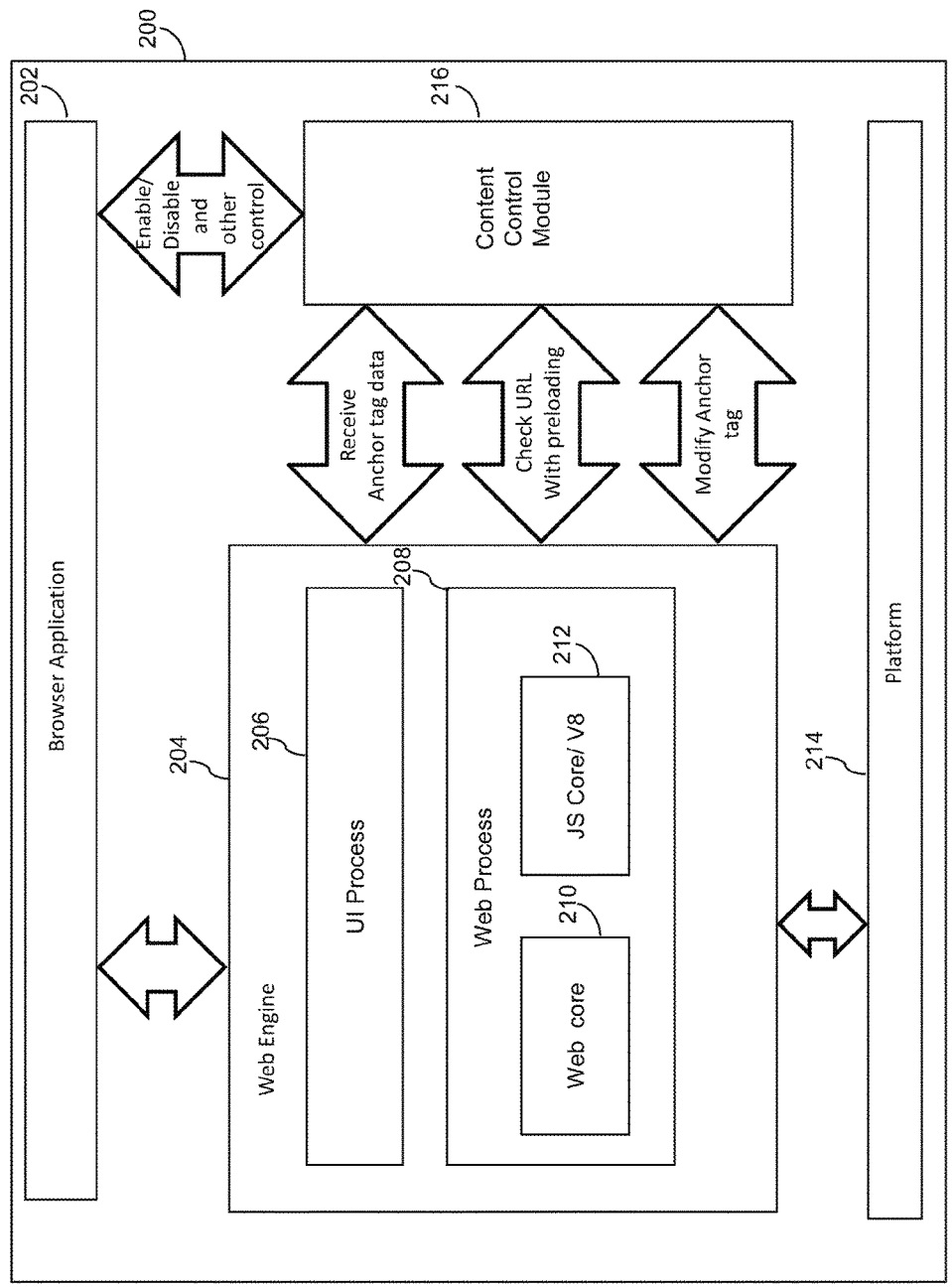
FIG. 2 is a block diagram of a system in accordance with one embodiment of the present invention.

FIG. 2 is a block diagram of a system 200 implemented in a client device for detecting inappropriate URLs, in accordance with one embodiment of the present invention. A browser application 202 is any application coded in a programming language such as but not limited to JavaScript, C, and C++. The web browser is a software application for retrieving, presenting, and traversing information resources on the World Wide Web (www). An information resource is identified by a Uniform Resource Identifier (URI) or a Uniform Resource Locator (URL). The Web browser further includes a User Interface (UI) Process 206, a web browser engine 204, Java Core (also known as JavaScript interpreter) 212, and Web core 210. The Web Process 208 wraps WebCore 210 and JavaScript Core 212 to render the results of a specified URL. The WebCore 210 is a layout, rendering, and Document Object Model (DOM) library for Hypertext Markup Language (HTML). Javascript Core 212 is a framework that provides computer software in Interpreting and executing JavaScript. The web browsers can display any kind of content including images, audio, video, and Extensible Markup Language (XML) files, and often have plug-ins to support Flash applications and Java applets.

Further, the web browser engine 204 also called as layout engine is a software component that takes marked up content such as HTML, Extensible Markup Language (XML), and image files and formatting information such as Cascading Style Sheets (CSS), Extensible Style Sheet (XSL) and displays the formatted content on the screen. A Platform 214 for the Web browser can be one of HTML, CSS, DOM, and JavaScript. Examples of the web browsers include but are not limited to Internet Explorer, Mozilla Firefox, Opera, Safari, Google Chrome, Konqueror, Arora, Dillo, Lynx, Amaya, NetPositive, Planetweb, and Netscape.

The browser application 202 on the Client device operates in one of the operating modes, a normal mode and a supervisory mode. A Content control module 216 manages the Supervisory mode. The Content control module 216 preloads entire URLs or links present within a requested web page and check authenticity of content pointed to by the URLs and further display a modified web page to the user after disabling inappropriate URLs.

Various embodiments related to the use of the system 200 for implementing the present invention is described herein. In one embodiment, a user requests for a web page by entering a URL in the web browser. The browser application 202 checks if the operating mode is one of the Supervisory mode and the normal mode. If the supervisory mode is enabled, the content control module 216 extracts anchor tag data from the requested web page. In the web page, links are specified using an ("</a>") anchor tag. The <a> tag defines a hyperlink, which is used to link from one page to another. The most important attribute of the <a> element is the href attribute, wherein href indicates the URL of the page the link goes to. In HTML5, the <a> tag is always a hyperlink, but if the tag does not have a href attribute, it is only a placeholder for a hyperlink. For every anchor tag encountered in requested webpage, the URL information is sent to the content control module 216. The content control module 216 preloads each URL to fetch at least one of metadata and web page content pointed to by the URL. The Metadata summarizes basic information about the web page, descriptions of the page's contents and keywords linked to the content. For example, author, date created, meta tag, content description, date modified and file size are basic metadata information. The web page content includes images, text, and content description of the web page. The content control module 216 analyses at least one of metadata information and web page content to check if the URL points to an inappropriate data. Often, the anchor tags may point to content, including adult videos, pornography, drugs, gambling, violence, sexual aids, marketing and the like. However, the Content control module 216 modifies the anchor tags pointing to inappropriate data. Finally, the web page rendered to the user is modified and free of inappropriate URLs.

Furthermore, the system includes a bus communicating with a plurality of web applications and web engine; and a display device providing user interface, wherein the user interface provides communication of a user with the system. The rendered web page is also displayed, enabling the user with controls to navigate forward and backward through the web pages.

Figure 3:
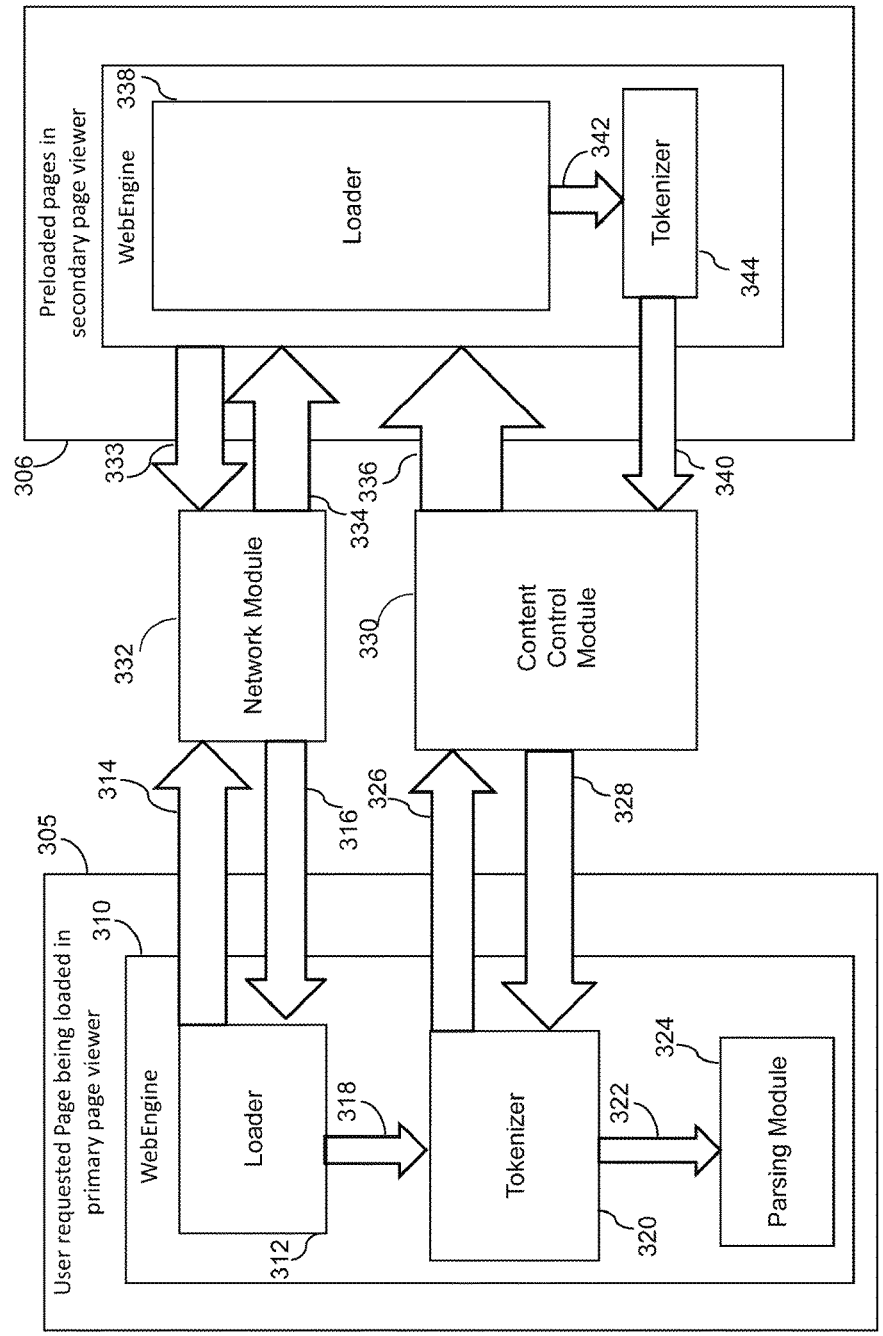
FIG. 3 illustrates a control flow block diagram showing interaction of a content control module with Web browser engine, in accordance with another embodiment of the present invention.

FIG. 3 illustrates a control flow diagram showing interaction of a content control module with a web browser engine, in accordance with another embodiment of the present invention. When user requests for a specific web page in a web browser, loader module 312 present in a primary page viewer 305 sends a load request 314 to a network module 332. Further, the loader module 312 in the primary page viewer 305 starts receiving data 316 relating to the requested web page from the network module 332. Once the specified web page is fetched, the loader module 312 transmits the web page data to a Tokenizer module 320 at step 318. The Tokenizer module 320 in the primary page viewer 305 starts parsing and tokenizing anchor tags and URL present in the requested webpage. The general techniques of parsing are applied by the parsing module 324, for example one parsing technique includes but not limited to Dom and render Tree creation. Further, for every anchor tag encountered in requested webpage, the URL information is sent to the Content Control module 330 at step 326. At step 336, Content Control module 330 requests the web engine to preload the page pointed to by the URL in secondary page viewer 306 running on the background. The intention of preloading each URL is to fetch the metadata and web page content of page pointed to by the corresponding URL. At Step 333, Loader module in secondary page viewer 306 requests the page relating to the URL from the network loader module 332. The Loader module 338 in secondary page viewer 306 receives the page data at step 334. At step 342, Loader Module 338 will pass the data to tokenizer module 344. At step 340, Tokenizer Module will notify the existence of the metadata information to the Content Control module 330. The metadata information includes plurality information such as content description tag, image tag, and text. At step 328, Content Control module 330 will modify the anchor tag information in first page viewer 305 if inappropriate content is present in one of metadata information and web page content. The anchor tag will be modified to a dummy DIV tag or a dummy IMG tag in primary page viewer 305. At step 322, the user requested page will be rendered in primary page viewer 305 with all the URLs pointing towards unwanted contents disabled. The user cannot find the disabled URLs even in the HTML source code; the inappropriate URLs are completely hidden from the user.

The URL can be disabled by one of replacing the inappropriate URL with a dummy link, hiding the inappropriate URL with a text message, and redirecting the inappropriate URL to a valid URL. Further, while disabling inappropriate URL, the tokenizer and parser can check for specific areas in the requested web page. Often, inappropriate content are placed in a specific area of the web page. Therefore, scanning the specific area is sufficient if the processing speed of the client device is less.

In an embodiment, a web page requested by a user is retrieved in a primary page viewer. Further, a first URL detected in the web page is preloaded in a secondary page viewer, wherein the secondary page viewer is open in background. If a second URL is detected in the web page, then the second URL is preloaded in another secondary page viewer. The process continues and each URL detected is opened in subsequent secondary page viewers. It is to be noted that these subsequent secondary page viewers are running in the background. Thus, a 'N'th URL detected in the web page is preloaded in a Nth secondary page viewer running in the background, wherein 'N' is an integer greater than or equal to one. Further, processing of URLs detected in the web page can be done in at least one of serial, batch, and parallel. In serial processing, the URL is preloaded one at a time and checked for offensive content. In batch processing, a set of URLs are assigned as batches of URLs from plurality of URLs and each URL is processed, and checked for offensive content. In parallel processing, all the URLs detected in the web page are preloaded simultaneously and checking is performed on all the URLs simultaneously. The parallel processing can be implemented based on the processing capabilities of the client device. Secondary page viewers will be connected to Network module to provide parallel processing.

Figure 4A:
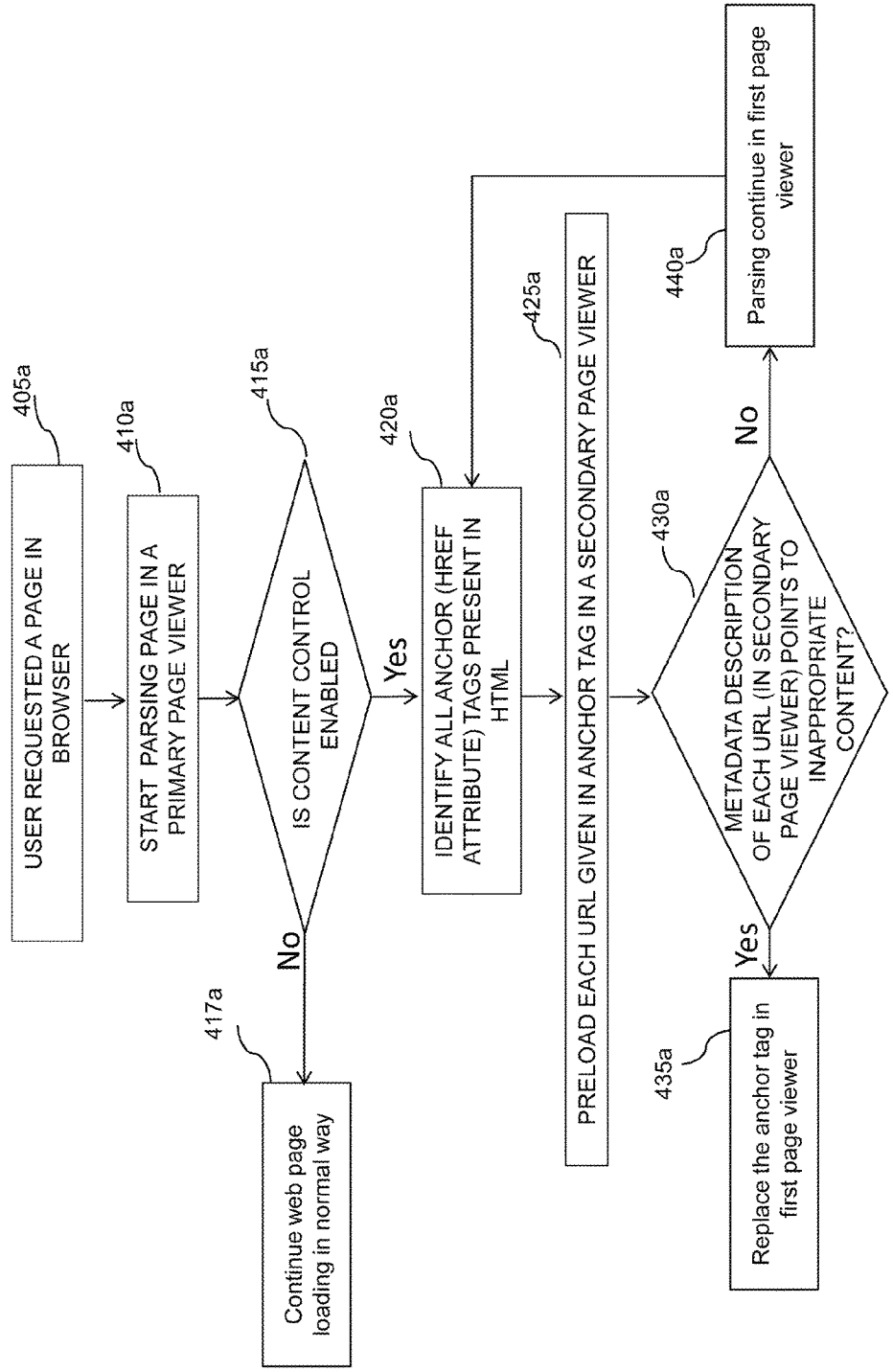
FIGS. 4A, 4B and 4C illustrate flowcharts showing the operating sequence for rendering a web page free of inappropriate URLs.

FIG. 4A illustrates a flowchart showing the operating sequence for rendering a web page free of inappropriate content by serial processing.

At step 405a, user requested a web page in a browser. The requested web page is loaded in a primary page viewer via a loader module. The primary page viewer is visible to the user.

At step 410a the primary page viewer starts parsing the requested web page.

At step 415a, if content control is enabled, step 420a is performed, else step 417a is performed.

At step 417a, the web page will continue loading in a normal way without parsing, preloading, and content filtering since content control is not enabled.

At step 420a, all anchor tags present in the web page are identified by the tokenizer. A href attribute present in the anchor tags will point to other URLs, and hyperlinks.

At step 425a, each URL represented by the anchor tag is preloaded in a secondary page viewer to fetch metadata and web page content associated with the URL. Metadata will give information about contents in the URL.

At step 430a, the content control module checks if the metadata information and web page content of each URL present in the secondary page viewer points to one of appropriate content and inappropriate content. If the URL points to an inappropriate content, then step 435a are performed, else step 440a is performed.

At step 435a, the anchor tag of the URL pointing to the inappropriate content is replaced by one of a dummy URL, a text, an image. Thus, a modified web page is presented to the user after disabling all the inappropriate URLs.

At step 440a, parsing continues in the primary page viewer for the remaining part of the web page.

Figure 4B:
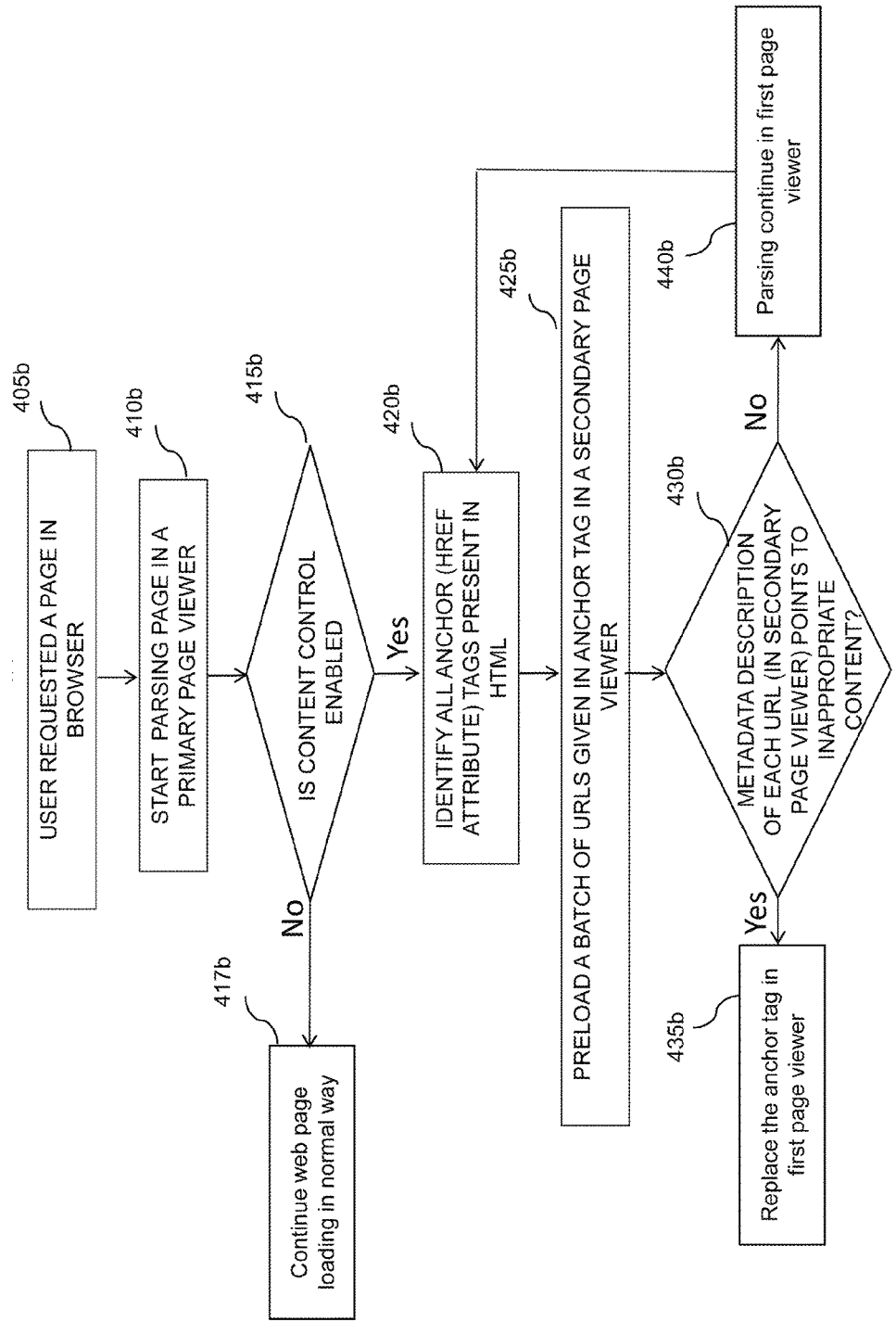

FIG. 4B illustrates a flowchart showing the operating sequence for rendering a web page free of inappropriate content by batch processing.

At step 405b, user requested a web page in a browser. The requested web page is loaded in a primary page viewer via a loader module. The primary page viewer is visible to the user.

At step 410b, the primary page viewer starts parsing the requested web page.

At step 415b, if content control is enabled, step 420b is performed, else step 417b is performed.

At step 417b, the web page will continue loading in a normal way without parsing, preloading, and content filtering since content control is not enabled.

At step 420b, all anchor tags present in the web page are identified by the tokenizer. A href attribute present in the anchor tags will point to other URLs, and hyperlinks.

At step 425*b*, batch of URLs represented by the anchor tag is preloaded in a secondary page viewer to fetch metadata and web page content associated with the URL. Metadata will give information about contents in the URL.

At step 430*b*, the content control module checks if the metadata information and web page content of each URL present in the secondary page viewer points to one of appropriate content and inappropriate content. If the URL points to an inappropriate content, then step 435*b* are performed, else step 440*b* is performed.

At step 435*b*, the anchor tag of the URL pointing to the inappropriate content is replaced by one of a dummy URL, a text, an image. Thus, a modified web page is presented to the user after disabling all the inappropriate URLs.

At step 440*b*, parsing continues in the primary page viewer for the remaining part of the web page.

Figure 4C:
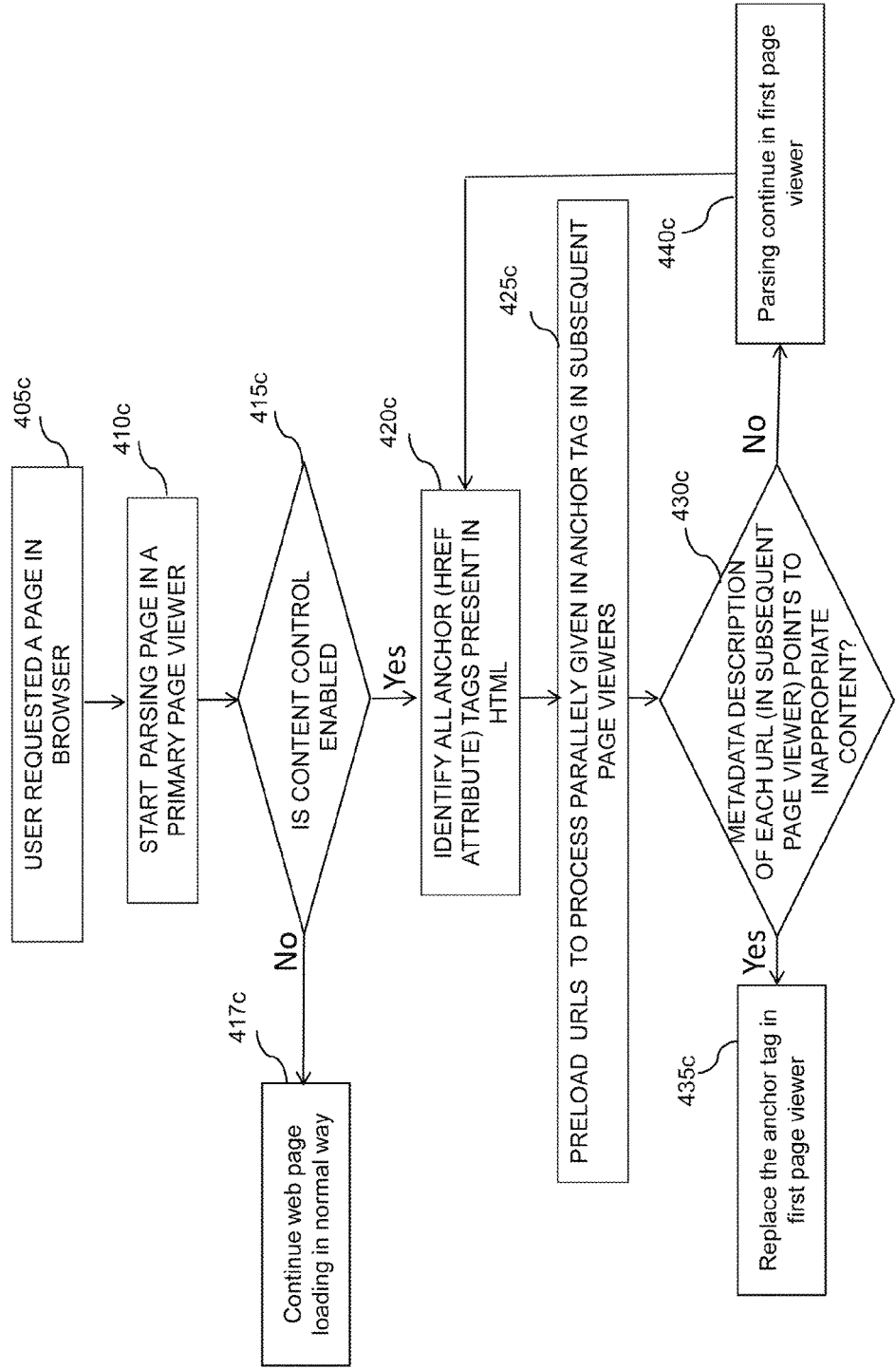

FIG. 4C illustrates a flowchart showing the operating sequence for rendering a web page free of inappropriate content by parallel processing.

At step 405*c*, user requested a web page in a browser. The requested web page is loaded in a primary page viewer via a loader module. The primary page viewer is visible to the user.

At step 410*c*, the primary page viewer starts parsing the requested web page.

At step 415*c*, if content control is enabled, step 420*c* is performed, else step 417*c* is performed.

At step 417*c*, the web page will continue loading in a normal way without parsing, preloading, and content filtering since content control is not enabled.

At step 420*c*, all anchor tags present in the web page are identified by the tokenizer. A href attribute present in the anchor tags will point to other URLs, and hyperlinks.

At step 425*c*, URLs for parallel processing represented by the anchor tag are preloaded in the subsequent page viewers for simultaneous processing to fetch metadata and web page content associated with the URL. Metadata will give information about contents in the URL.

At step 430*c*, the content control module checks if the metadata information and web page content of each URL present in the secondary page viewer points to one of appropriate content and inappropriate content. If the URL points to an inappropriate content, then step 435*c* are performed, else step 440*c* is performed.

At step 435*c*, the anchor tag of the URL pointing to the inappropriate content is replaced by one of a dummy URL, a text, an image. Thus, a modified web page is presented to the user after disabling all the inappropriate URLs.

At step 440*c*, parsing continues in the primary page viewer for the remaining part of the web page.

Figure 5A:
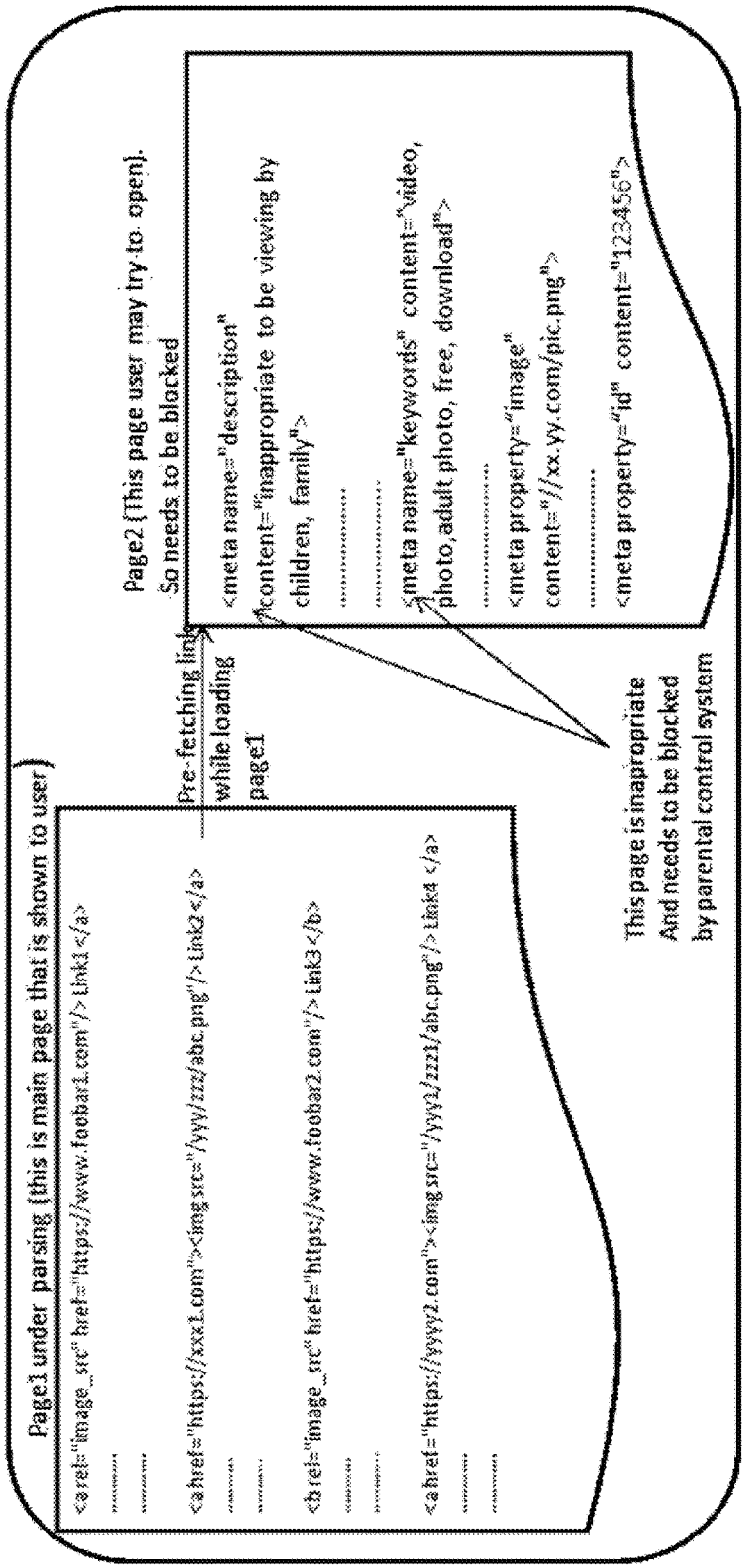
FIG. 5A is an exemplary illustration of fetching a web page requested by a user.

FIG. 5A is an exemplary illustration of fetching a page requested by a user. The requested web page opens in a primary page viewer. The parser scans the HTML code of the web page to identify anchor tags present. Examples of the anchor tags present in the web page are <a rel="image_src"href="https://www.foobartcom"/>link1</a> (hereafter referred as a first tag), <a href="https://xxx1.com"><img src="/yyy/zzz/abc png"/>Link2</a> (hereafter referred as a second tag). Further, first tag, second tag and the like are preloaded in a secondary page viewer by a content control module to fetch metadata description. The metadata description of the second tag states that content is inappropriate for viewing by children. Further, keywords present in the metadata description suggest that the second tag include adult photo. Thus, the second tag needs to be disabled.

Figure 5B:
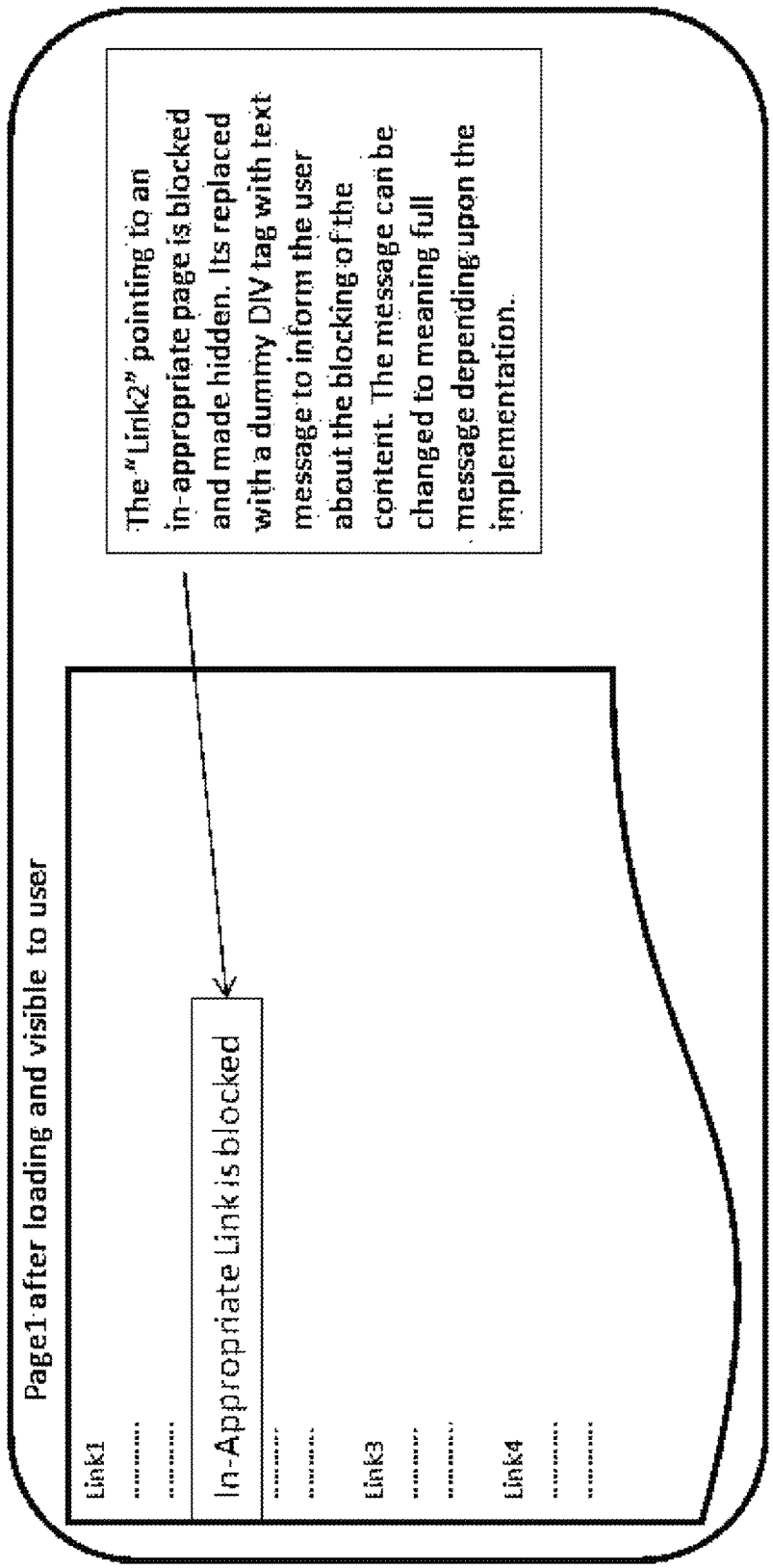
FIG. 5B is an exemplary illustration of modifying a user requested page.

FIG. 5B is an exemplary illustration of modifying user requested page. The content control module disables the second tag pointing towards inappropriate content. The link pointing to inappropriate content is either blocked or hidden. The second tag is replaced by a dummy DIV tag with a text message to inform the user about the blocking of the content. The text message can be changed to meaningful message depending upon the implementation.

In one embodiment of the present invention, the content control module enables a supervisor to store addresses of authorized websites in a database. Further, the database can include keywords, URLs for detecting malicious content. Thus, after preloading the URLs present within a webpage; the corresponding metadata will be compared to the strings, and keywords present in the database. Further, if a match occurs during comparison, the web page is treated as suspicious.

In another embodiment of the present invention, the content control module can be a parent control module enabling a parent to control the browsing activities of a child. The parent can specify in a database, inappropriate keywords, and website URLs. Thus the system will prevent the child from accessing the web pages with inappropriate content.

In another embodiment of the present invention, the client device can be a Smart television (TV). While browsing internet on Smart TV, content filtering can be applied using a Content Control Module. Therefore, the system not only prevents the browser from opening an unwanted page in a Smart TV, but also prevents opening of a web page with unwanted links.

In another embodiment of the present invention, the system can preload any document including HTML, XML, PDF, images, hyperlinks and text and perform content control. The system can remove inappropriate images, text and PDF links from the user requested web page. Thus, the system is valid for any web document.

In yet another embodiment of the present invention, the system can perform content control in any web browser including but are not limited to Internet Explorer, Mozilla Firefox, Opera, Safari, Google Chrome, and Konqueror.

Advantageously, the embodiments specified in the present invention enables a system wherein URLs of the suspicious contents will not be visible and navigate-able to a user of a requested page. Further, the suspicious URLs are invisible even in html source code of the web page. Furthermore, the system enables to have a strong parental control in Smart television, thereby preventing children from viewing adult content and other inappropriate URL. Further, the system can be implemented in document viewers based on URL, thereby disabling inappropriate URL in any document.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

What is claimed is:

1. A method for disabling inappropriate Universal Resource Locators (URLs) in a web page, the method comprising:

loading the web page;

parsing the web page to obtain at least one URL present in the web page;
preloading the obtained URL comprises fetching at least one of metadata information and web page content corresponding to the obtained URL,
wherein the preloading the obtained URL comprises preloading each URL identified in the web page into a secondary page viewer that is running in background;
identifying whether the obtained URL comprises inappropriate content based on the at least one of the metadata information and the web page content of the obtained URL;
based on identifying that the obtained URL comprises the inappropriate content, modifying the web page by disabling the obtained URL; and
rendering the modified web page,
wherein the disabling comprises disabling the obtained URL by replacing information identifying the obtained URL with at least one from among a text, an image and a dummy URL.

2. The method as claimed in claim 1, wherein preloading the obtained URL comprises one of:
serial processing, wherein the serial processing comprises preloading a set of URLs from the URL successively;
batch processing, wherein the batch processing comprises preloading a set of URLs from the URL as batches of URLs; and
parallel processing, wherein the parallel processing comprises preloading a set of URLs from the URL simultaneously.

3. An electronic device for identifying inappropriate Universal Resource Locators (URLs) in a web page, the electronic device comprising:
a network interface configured to fetch a web page, wherein the network interface fetches the web page from a web server;
a controller configured to control the electronic device to perform:
loading the web page;
parsing the web page, wherein the parsing comprises obtaining a URL present in the web page;
preloading the obtained URL comprises fetching at least one of metadata information and web page content corresponding to the obtained URL, wherein the preloading the obtained URL comprises preloading each URL identified in the web page into a secondary page viewer that is running in background;
identifying whether the obtained URL comprises inappropriate content based on the at least one of the metadata information and the web page content of the obtained URL;
based on identifying that the obtained URL comprises the inappropriate content, modifying the web page by disabling the obtained URL; and
rendering the modified web page,
wherein the disabling comprises disabling the obtained URL by replacing information identifying the obtained URL with at least one from among a text, an image and a dummy URL.

* * * * *